United States Patent [19]

Palmer

[11] Patent Number: 5,195,135
[45] Date of Patent: Mar. 16, 1993

[54] AUTOMATIC MULTIVARIATE CENSORSHIP OF AUDIO-VIDEO PROGRAMMING BY USER-SELECTABLE OBSCURATION

[76] Inventor: Douglas A. Palmer, 1229 Trieste Dr., San Diego, Calif. 92107

[21] Appl. No.: 745,056

[22] Filed: Aug. 12, 1991

[51] Int. Cl.$^5$ .............................................. H04N 7/16
[52] U.S. Cl. ....................................... 380/20; 358/349
[58] Field of Search ................... 380/20; 358/349, 84; 455/185, 186

[56] References Cited

U.S. PATENT DOCUMENTS

| | | | |
|---|---|---|---|
| 4,520,404 | 5/1985 | Von Kohorn | 358/335 |
| 4,685,131 | 8/1987 | Horne | 380/20 |
| 4,930,158 | 5/1990 | Vogel | 380/20 |
| 4,930,160 | 5/1990 | Vogel | 380/23 |
| 4,995,078 | 2/1991 | Monslow | 380/10 |

Primary Examiner—Salvatore Cangialosi
Attorney, Agent, or Firm—Baker, Maxham, Jester & Meador

[57] ABSTRACT

A method and apparatus for the automatic censorship of audio-video programming at the receiver in accordance with a viewer-selected censorship mode and multivariate censorship classification data encoded in the audio-video programming signal. The censorship classification data comprise codes that classify the programming for several different subjects and several different censorship levels, including internal video frame coordinates that map the censorship classification data to every region within each frame. Censorship of the audio-video programming is accomplished by automatically obscuring the audio and/or video signal to prevent user discomfort. The viewer perceives this automatic obscuration as a fuzzy vagueness in the audio or video frame, which avoids viewer distraction of discomfort associated with abrupt blanking or programming substitution. The censorship method is readily applicable to cinema performances through the use of cinema film encoding and light-valve obscuration techniques.

24 Claims, 3 Drawing Sheets

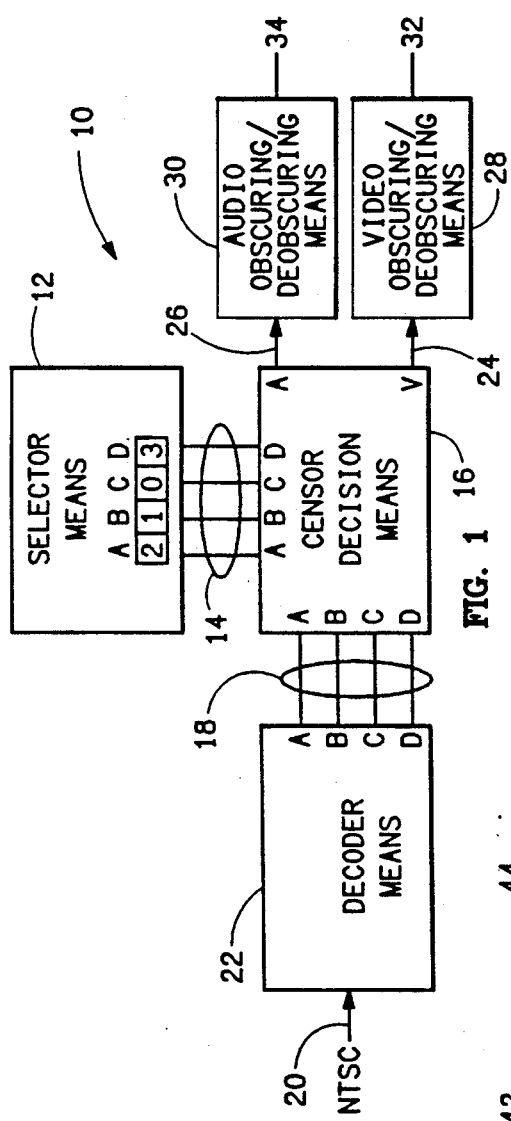
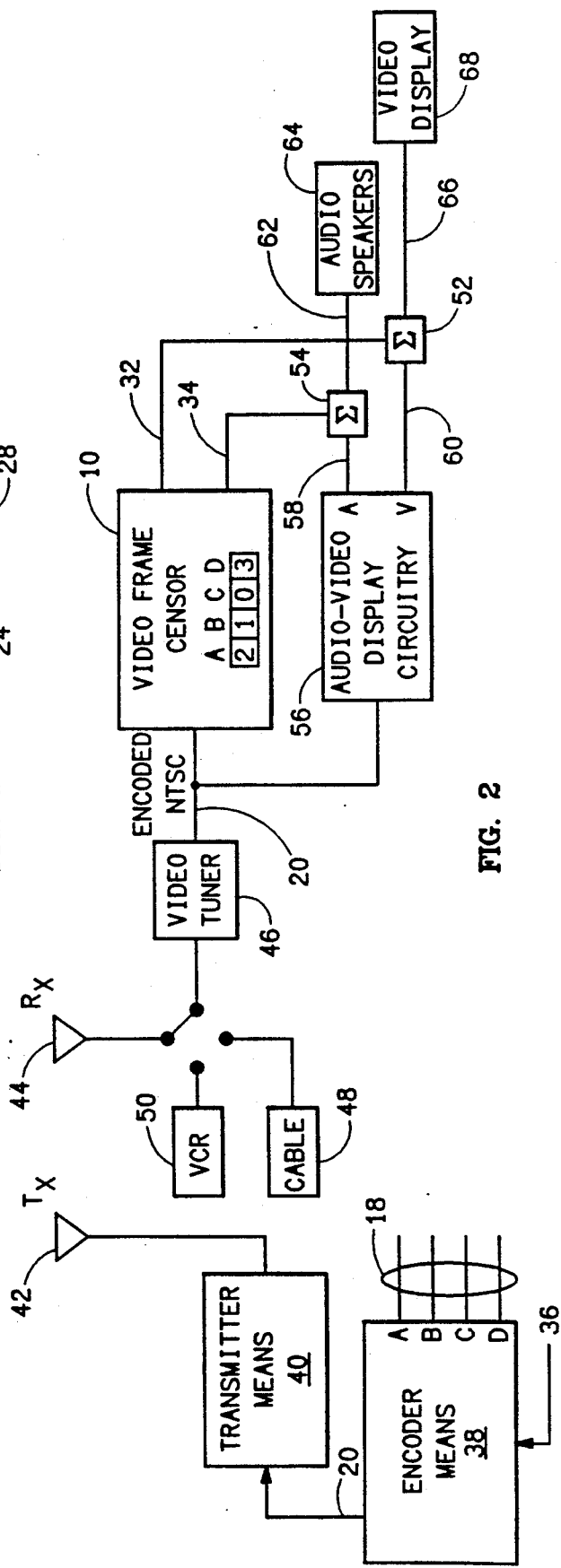

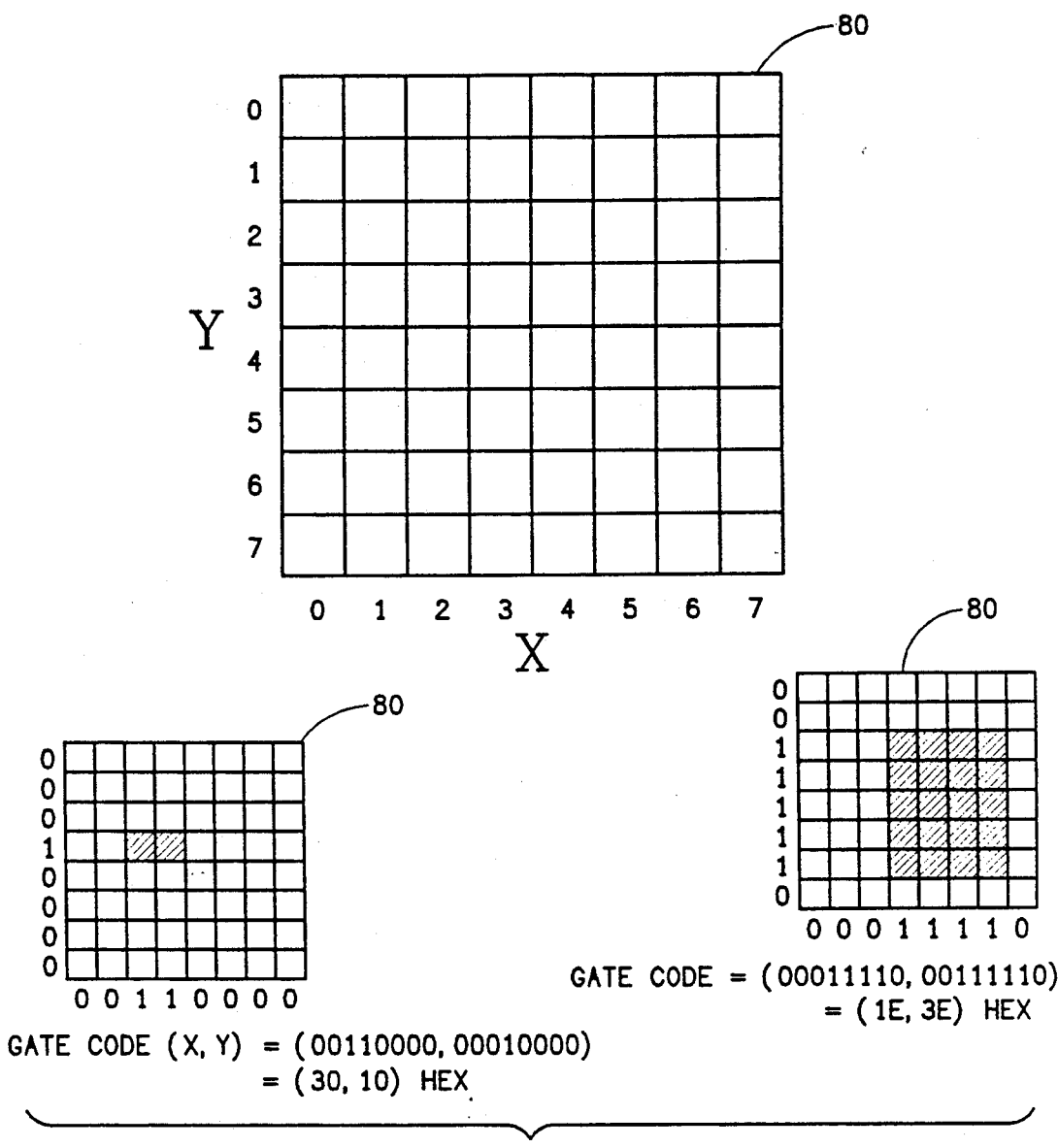

AUTOMATIC MULTIVARIATE CENSORSHIP OF AUDIO-VIDEO PROGRAMMING BY USER-SELECTABLE OBSCURATION

BACKGROUND OF THE INVENTION

1. Field of the Invention

My invention relates to methods and apparatus for automatic censorship of audio-video programming, which includes television broadcasts, cablecasts, direct satellite narrowcasts, distribution of video tape or video disk recordings, or any other means whatsoever for mass distribution of audio-video information, and, more specifically, my invention relates to frame-by-frame censorship of audio-video programming in accordance with a viewer-selectable multivariate censorship mode.

2. Description of the Related Art

Censorship of audio-video material is an accepted means for preventing access to violent or pornographic material by minors or sensitive adults. Such censorship may take the form of a movie rating system for controlling access to theaters, broadcast reception blocking receiver decoders or parental advisories preceding a broadcast and other similar methods. In some cases viewers censor themselves, taking discretionary action such as closing their eyes or avoiding movies or video broadcasts all together to avoid the discomfort of seeing or hearing objectionable program material. Audio-video programming vendors are obliged to carefully balance the moral convictions of some viewers with the aesthetics of others. Various segments of society find offense in different subject matters, such as adult situations, nudity/sex, violence and distasteful language. One viewer may object to a simple kiss on the screen but find bloody mayhem entertaining and another may be offended by a simple blow to the nose while easily tolerating full frontal nudity. Satisfying the general social aesthetic without muting the artistic and entertainment value of audio-video programming requires a very delicate and difficult balancing act.

Cinema production companies, wishing to attract as large an audience as possible, may choose to script and produce cinema productions with R-ratings, knowing that large minority segments of the population will be dissuaded from viewing such an R-rated film. In fact, the display of R- and X-rated movies is often restricted by local zoning ordinances, which results in undesired restrictions on the audience size for the nonobjectionable portions of such cinema productions as well as the objectionable material.

Practitioners in the art have long been aware of the difficult problems presented by variations in taste and artistic sentiment in the general population and the effect of these problems on the distribution of audio-video programming. There is a long felt need in the art for a reliable and useful means for automatic censorship of audio-video programming material according to a multivariate set of preselected classifications. The censorship methods known in the art generally suffer from a number of unresolved deficiencies.

For instance, U.S. Pat. No. 4,520,404, issued to Von Kohorn, discloses a remote recording and editing system for use with audio-video broadcast programming. Von Kohorn teaches the monitoring of broadcast transmissions at the transmitter to develop recording and editing command signals for separate transmission to a subscribing user, who then makes use of these separate recording and editing signals to censor the related audio-video programming material. Von Kohorn's system is somewhat prone to error because of the real-time monitoring scheme, which does not provide a look-ahead monitoring capability. Another limitation is that, during the period that the material is being censored, Von Kohorn's receiver is merely disabled, presenting intermittent blank screen and/or silence, which may be uncomfortable to the viewer. Thus, his scheme is limited in usefulness to "zapping" commercials and entire program segments.

U.S. Pat. No. 4,930,160, issued to Peter S. Vogel, discloses an automatic censorship technique for audio-video programs involving the receipt of a prescribed classification code or code group together with the associated audio-video programming material. The classification code can be encoded into the broadcast or tape or may originate from a separate source. Vogel uses the classification code to switch a receiver to alternate audio-video programming material during the censored interval. Vogel teaches a method for simple automatic censorship of material such as commercials by complete substitution but does not suggest a means for smoothly obscuring potentially offensive material in a manner that is unobtrusive to the viewer. Neither does Vogel discuss means for retaining the nonoffensive portions of the censored audio-video programming. Moreover, Vogel's method is not suitable for use in selective censorship of audio-video programming based on a multivariate censorship mode selected by the viewer. Vogel's viewer is merely afforded means for diverting to alternate programming material for the duration of a program having a single censorship classification variable.

Other practitioners have introduced audio-video programming methods suitable for use in subscriber pay-TV systems using direct satellite feed. For instance, U.S. Pat. No. 4,685,131, issued to Horne, discloses an elaborate subscriber audio-video media pay-per-view system. Horne does not consider the problem of intra-program censorship or blocking, however.

A single variable censorship system for an entire audio-video program fails to reflect the multivariate censorship required to please a variety of individual tastes when showing any audio-video programming material. For example, many people would prefer a movie having an R-rating with respect to sexual content, but also desire a G-rating with respect to violence or language content. At any particular point in an audio-video program, the sexual content, the violence content, language content and adult situation content may be classified at different levels. A single variable that reflects the highest level of classification throughout the entire program unjustly and inappropriately overclassifies the preponderance of the audio-video program material that might be enjoyed by even the most sensitive viewer.

Accordingly, there is a strongly-felt need in the art for an automatic multivariate censorship method applicable to audio-video programming that will permit the viewer to select a multivariate mode of censorship that includes a preferred level of censorship for a variety of different subjects, thereby permitting the viewer to enjoy any audio-video programming with the uniquely offensive portions discretely obscured from viewing and hearing. These unresolved problems and deficiencies are clearly felt in the art and are solved by my invention in the manner described below.

SUMMARY OF THE INVENTION

My invention provides a novel means for automatically censoring audio-video programs at the discretion of the viewer. My Video Frame Censor (VFC) invention provides broadcasters, movie studios and video rental companies the freedom to incorporate any potentially objectionable subject matter into films and programming so long as they encode into each release a set of censorship classification data having a format and content suitable for recovery at the user's display system. A preferred embodiment of my VFC apparatus is adapted for interconnection with a standard television receiver and includes means for user-selection of a censorship mode threshold for each of a plurality of censorship subjects. My VFC apparatus compares the classification levels in the censorship classification data recovered from the audio-video programming with the censorship mode thresholds selected by the viewer and generates a video and audio obscuration gate signal for each frame of the audio-video programming.

Another important feature of my invention is my obscuration technique, which is used to censor both audio and video programming material. The audio material is censored by obscuring or muffling the audio signal for an entire frame interval, which is typically less than 40 ms. The video image is censored by obscuring or blurring the video signal within a single group of one or more cells within each frame. In my preferred embodiment, each frame comprises eight rows and eight columns of cells for a total of 64 individual video cells. The censorship classification data for each frame includes two 2-digit hexadecimal numbers to identify the boundaries of the multicell region to be obscured within the frame. The obscured region is a rectangle comprising one or more cells within the frame. My frame-by-frame censorship classification data format is suitable for encoding into the bottom of each video frame near the colorburst signal or at some suitable point within the vertical retrace portion of the standard NTSC video signal format.

The generation of censorship classification data according to my preferred format can be accomplished in any suitable manner such as through detailed review by trained censors to identify the precise frame-interval portions of the audio track and the precise regions of each video frame requiring censorship. This classification process must be repeated for each of several censorship subjects and progressive censorship levels. In practical terms, the generation of these censorship classification data would be completed as part of the final audio-video editing process, which already involves meticulous frame-by-frame adjustments.

Such an editing and encoding procedure can also be used to add a second optical signal, similar to the present optical sound track signal, to a cinema projection film embodiment of an audio-video program. An alternate embodiment of my invention is adapted for the multivariate censorship of such cinema projection performances having the necessary censorship classification encoding.

An important advantage of my invention is that a single audio-video program can be censored in accordance with a wide variety of user-selected censorship modes. Another important advantage of my invention is that the censorship of audio and video material is accomplished on a frame-by-frame basis, thereby minimizing the amount of non-offensive material that is unnecessarily deleted to avoid offending a particular viewer. Yet another distinctive advantage of my invention is that the audio and video material that is censored by my VFC apparatus is censored by obscuration instead of deletion or substitution. This minimizes the intrusive and disruptive effect of such censorship, ensuring maximal viewer enjoyment of the censored audio-video programming.

Another important feature of my invention is that the audio-video program can be broadcast in a precensored format by obscuring all portions of each video frame for which the censorship classification data requires censorship at any viewer-selected threshold. In my preferred embodiment, the obscuration is performed by interleaving or cutting and pasting of the video raster scan line. Thus, the level of brightness remains the same and the obscuration is simply perceived as a defocused field in the picture frame. Because this obscuration is accomplished according with a reversible algorithm, the obscured field may be "deobscured" by processing the obscured frame region in accordance with the reverse algorithm. Thus, a precensored audio-video broadcast would be decensored at the receiver in accordance with user mode settings.

Finally, an important feature of my invention is the multivariate censorship characteristics. I use the term multivariate censorship to mean simultaneous censorship of several different subjects, with each subject censored to a different threshold. That is, say, simultaneous censorship of nudity/sex to a level suitable for children and violence/mayhem to a level suitable for sophisticated adults. Because a censorship threshold can be independently adjusted by the user for each of several censorship subjects, a single encoded audio-video program can be viewed by a wide variety of viewers, each selecting a different plurality of censorship mode thresholds, and each enjoying nearly all available non-objectionable material.

The foregoing, together with other features and advantages of my invention, will become more apparent when referring to the following specifications, claims and the accompanying drawings.

BRIEF DESCRIPTION OF THE DRAWINGS

For a more complete understanding of my invention, I now refer to the following detailed description of the embodiments illustrated in the accompanying drawings wherein:

FIG. 1 shows a block diagram illustrating the preferred embodiment of my VFC apparatus;

FIG. 2 shows a block diagram illustrating a typical application of my multivariate censorship system for audio-video programming;

FIG. 4 shows the preferred arrangement of cells in a single video frame and my preferred encoding scheme for obscuring a region within a single frame; and FIG. 5 illustrates the multivariate censorship classification data encoding requirements for the preferred embodiment of my invention.

DESCRIPTION OF THE PREFERRED EMBODIMENTS

Figure 3:
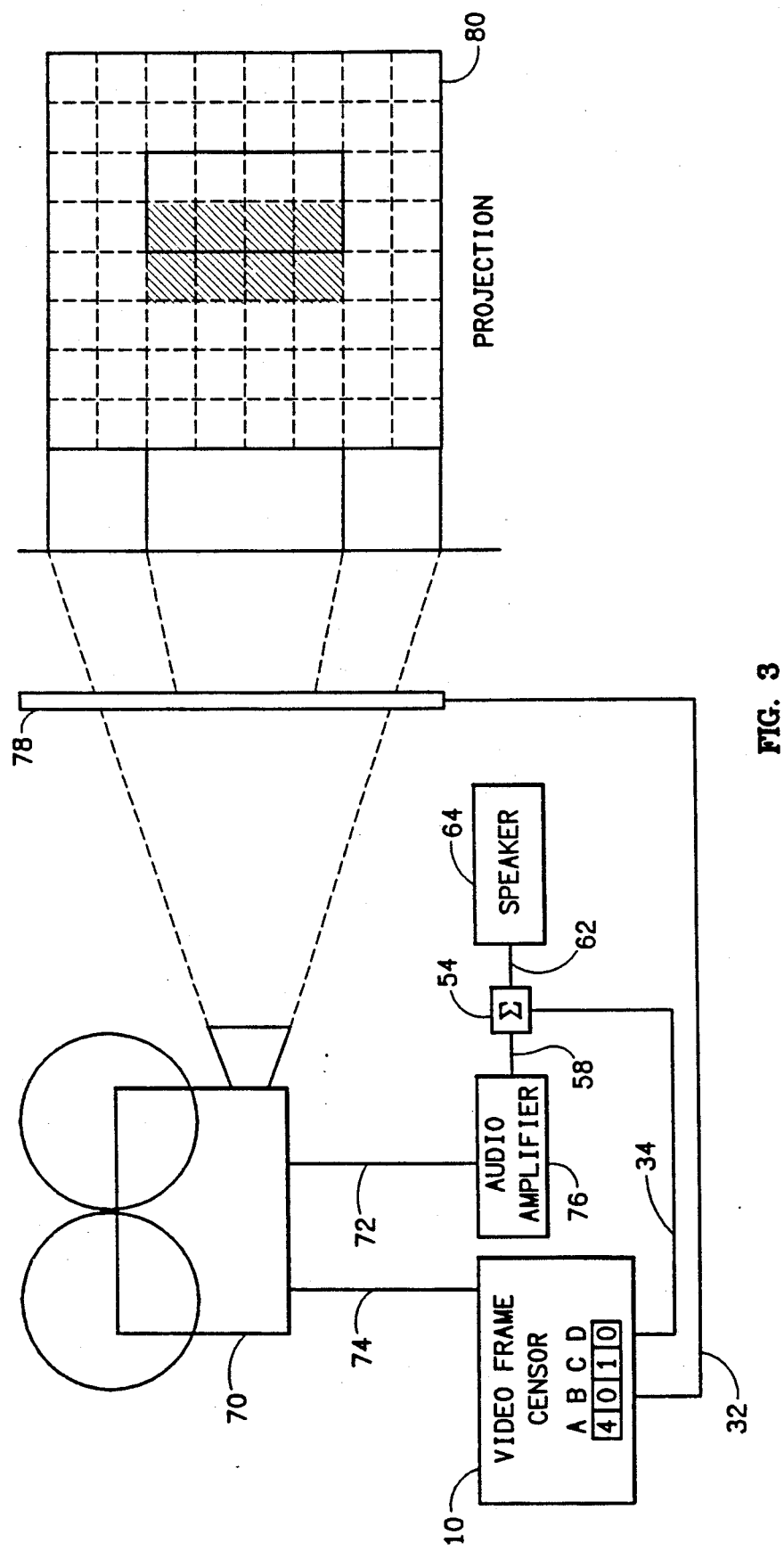
FIG. 3 illustrates an alternate embodiment of my VFC apparatus applied to cinema projection performances.

FIG. 1 shows the basic functional arrangement of my Video Frame Censor (VFC) 10. VFC 10 comprises a selector means 12 that is adjusted by the user to establish a classification mode threshold 14 for each censorship subject. In FIG. 1, I show four censorship subjects A-D and the user has adjusted censorship mode threshold 14A to level 2, mode threshold 14B to level 1, 14C to level 0 and 14D to level 3. Mode thresholds 14 are presented to a censor decision means 16 for comparison with the censorship classification data 18 that are recovered from the incoming audio-programming signal 20 by the decoder means 22.

Censorship classification data 18 comprise classification levels 18A-D for a single audio-video frame. Censorship classification data 18 also comprise a video frame region code for each censorship subject A-D. Thus, censor decision means 16 operates to compare the classification level from data 18A with the mode threshold 14A. If classification level datum 18A equals or exceeds mode threshold 14A, then censor decision means 16 generates a video gate signal 24, which includes the video frame region code from classification data 18A. In similar manner, classification level datum 18B is compared with mode threshold 14B, level datum 18C with mode threshold 18C, and so forth. Each comparison results in the generation of either video gate signal 24 or an audio gate signal 26. Because all threshold comparisons are simultaneous, all resulting audio gate signals together form a single audio gate signal 26 and, through a more complex summation, all resulting video gate signals form a single video gate signal 24. Each threshold comparison can result in the censorship of a different video frame region. Thus, all video frame region codes from data 18 must also be summed to form the single video frame region datum included in video gate signal 24.

Gate signals 24–26 are presented to video obscuring means 28 and audio obscuring means 30, respectively. Video obscuring means 28 generates a video obscuring signal 32 comprising a video signal that is properly synchronized to obscure the specified region of the present video frame. This obscuration will appear to the viewer as a blurry, muddy, or otherwise indistinct region in the video frame. Audio obscuring means 30 generates an audio obscuring signal 34, which requires no frame region code because it muffles the soundtrack for the entire frame interval. Because the frame interval is typically less than 40 ms, audio obscuring means 30 is not required to synchronize with intra-frame cell timing.

FIG. 1 also serves to illustrate an alternative preferred embodiment of my invention wherein the initial audio-video transmission is precensored in each video frame region for which classification levels 18A-D exceeds zero. In that embodiment, video obscuring means 28 and audio obscuring means 30 serve to "deobscure", that is, reverse the effects of a reversible obscuration algorithm, in the obscured regions of the video frame. This is possible because the original or precensor obscuration would be obtained by interleaving, cutting and pasting of the video raster scan line, or any other suitable reversible algorithm means. Video and audio obscuring means 28–30, when functioning as deobscuring means, merely generate signals 32–34 to serve as the deobscured or decensored audio-video programming material instead of such signals to serve as obscuring supplements to the original program signals. In such an embodiment, the summing means 52–54 shown in FIG. 2 are not necessary.

FIG. 2 illustrates the manner in which my VFC invention can be added to an existing standard audio-video programming system to create an automatic multivariate censorship system for audio-video programming of the type comprising a series of frames, such as the standard NTSC television programming format. In FIG. 2, the encoded audio-video programming signal 20 is created by adding censorship classification data 18 to an audio-video programming signal 36 by means of an encoder means 38. Classification data 18 can be generated by trained censorship classifiers or editors immediately before the release of the final version of audio-video program 36.

Less than 16 hours should be sufficient for an experienced censorship classifier or editor, using a suitable automated censoring system, to encode a two-hour movie comprising 172,800 frames (averaging 3 frames/second). Encoding of live television broadcasts would require multiple reviewers working simultaneously.

The video censoring process consists of selecting a region of the video image and sound track in accordance with censorship classification guidelines. For example, a scene depicting an extremely graphic image of a man being slain by gunshot might be progressively obscured to suit each censorship classification level as follows. Level 3 would have no censoring. Level 2 might obscure the impact point of the bullet on the man's chest. Level 1 might obscure all bloody portions, and level 0 might obscure that whole side of the frame together with the sounds from the victim. Because the offending regions of the frame will merely be obscured, the viewer's attention will not be drawn to the censored region.

Returning to FIG. 2, encoded video-audio programming signal 20 is sent to a transmitter means 40 for general broadcast through a transmitting antenna 42. The radio signal is received at a receiving antenna 44 and provided to video tuner 46 in a manner well-known in the art. Alternatively, a similar properly encoded signal from a video cable 48 or a VCR 50 can be provided to video tuner 46 in lieu of the received broadcast signal from transmitter 42.

Video tuner 46 recovers the encoded audio-video programming signal 20 in a manner well-known in the art. Signal 20 is then provided to VFC 10 as discussed in connection with FIG. 1 above. Audio and video obscuring signals 32–34 are generated by VFC 10 and provided to the summing means 52 and 54, respectively. Encoded audio-video programming signal 20 is also provided to the audio-video display circuit 56, which generates an audio display signal 58 and video display signal 60 in a manner well-known in the television receiver art. Audio display signal 58 is then added to audio obscuring signal 34 by summing means 54 to create the audio censored display signal 62, which is then directly connected to an audio speaker 64. Similarly, video display signal 60 is added to video obscuring signal 32 by video summing means 52 to generate the censored video display signal 66, which is then directly connected to a video display means 68.

FIG. 3 illustrates an alternative embodiment of my invention, which is an automatic censor apparatus for selectable censorship of a cinema projection performance of the type having censorship classification encoding. VFC 10 is shown connected to a film projector 70. Projector 70 provides a soundtrack output 72 and a censorship classification data output 74 by sensing and decoding the optical tracks included on the cinema film medium. Output 74 is connected directly to VFC 10, which is shown as having a censorship mode threshold selected for each of four censorship subjects A-D. Soundtrack output 72 is connected to an audio amplifier 76, which generates audio display signal 58. VFC 0 generates audio obscuring signal 34 in the manner discussed above for FIGS. and 2. Audio obscuring signal 34 is added to audio display signal 58 by audio summing means 64 to generate censored audio display signal 52, which is then directed to audio speaker 64 in the manner discussed above in connection with FIG. 2.

VFC 10 also generates video obscuring signal 32 as discussed above for FIGS. 1 and 2, but video summing means 52 from FIG. 2 is replaced in FIG. 3 with a light valve means 78. Light valve means 78 could comprise an LCD flat panel display adapted to obscure transmission of light from projector 70 over certain regions of the frame 80. Thus, in concept, light valve means 78 serves the same function as video summing means 52 in FIG. 2; that is, the summation of the video display beam from projector 70 and video obscuring signal 32. In FIG. 3, frame 80 is shown as having eight of the 64 available cells Obscured. In my preferred embodiment, light valve means 78 uses a checkerboard or hatch pattern suited for merely obscuring the detail in the blocked cells without reducing the average light level perceived by the viewer, thereby minimizing the disruption of the frame in the eyes of the viewer.

FIG. 4 and 5 illustrate my preferred method for encoding the censorship classification data and the video frame region signals used in my VFC 10 apparatus. In FIG. 4, frame 80 is shown divided into eight rows and eight columns, comprising 64 cells. My invention permits the obscuring of any single region within frame 80 ranging in size from a single cell to the entire frame. I can express each region within that range as a pair of 2-digit hexadecimal numbers. One of the two examples in FIG. 4 shows a video frame region occupying two cells in the middle of frame 80. The code for this region is (30, 10) hexadecimal. In the second example, a larger region covering over half of frame 80 is shown at hexadecimal code (1E, 3E).

Referring to FIG. 5, I show my preferred multivariate censorship classification arrangement. My preferred arrangement provides three video subject areas and one audio subject area for censorship. Each subject area can be independently censored at four censorship levels ranging from no censorship at level 0 to maximum censorship at level 3. The levels are nested for each subject such that any censorship mode threshold selected by a viewer will effectively obscure and exclude any subject matter having a classification level greater than or equal to the selected mode threshold. In each of the three video subject categories A-C, 16 bits are required to describe the video frame region in which the video subject is classified at level 1, 2 or 3. Only a single bit is required to classify the audio subject category D because my invention obscures the entire audio signal for the frame interval, which is generally less than 40 ms. Thus, as can be appreciated by examining FIG. 5, my Video Frame Censor invention can be embodied in my preferred fashion through the addition of 148 bits of censorship classification data encoding to each frame of the audio-video programming.

Obviously, other embodiments and modifications of my invention will occur readily to those of ordinary skill in the art in view of these teachings. Therefore, my invention is to be limited only by the following claims, which include all such obvious embodiments and modifications when viewed in conjunction with the above specification and accompanying drawings.

I claim:

1. An automatic censor apparatus for selectable censorship of audio-video programming having censorship classification encoding and comprising a series of frames each of said frames having a plurality of cells, said apparatus comprising:
    selector means for selecting a multivariate mode of censorship having a plurality of mode thresholds;
    decoder means for recovering said censorship classification data from said encoded audio-video programming;
    censor decision means for generating audio and video obscuration commands in response to said censorship classification data that meet or exceed said selected censorship mode thresholds;
    video obscuring means for obscuring a predetermined number of cells less than said plurality of cells in each frame of said video programming in response to said video obscuration commands; and
    audio obscuring means for obscuring said audio programming in response to said audio obscuration commands.

2. The automatic censor apparatus described in claim 1 wherein said audio and video obscuration commands comprise:
    an audio gate signal for each said frame interval of said audio-video programming; and
    a video gate signal for each said frame of said audio-video programming, said video gate signal having cell coordinates defining the region within each said frame to be obscured.

3. The automatic censor apparatus described in claim 2 wherein said cell coordinates comprise:
    at least eight vertical and eight horizontal values whereby each said frame embraces at least 64 cells.

4. The automatic censor apparatus described in claim wherein said multivariate censorship mode thresholds comprise:
    at least four censorship thresholds for each of at least four different censorship subjects.

5. An automatic multivariate censorship system for audio-video programming comprising a series of frames each of said frames having a plurality of cells, said system comprising:
    encoder means for adding censorship classification data to each said audio-video programming frame interval, said censorship classification data having a plurality of independent censorship classification variables;
    transmitter means for transmitting said encoded audio-video programming to at least one user;
    receiver means for receiving said encoded audio-/visual programming;
    selector means for selecting a multivariate mode of censorship having a plurality of mode thresholds;
    decoder means for recovering said censorship classification data from said encoded audio-video programming;
    censor decision means for generating audio and video obscuration commands in response to said censorship classification data that meet or exceed said selected censorship mode thresholds;
    video obscuring means for a predetermined number of cells less than said plurality of cells in each frame of said video programming in response to said video obscuration commands; and audio obscuring means for partially obscuring said audio programming in response to said audio obscuration commands.

6. The automatic multivariate censorship system described in claim 5, wherein said audio and video obscuration commands comprise:
an audio gate signal for each said frame interval of said audio-video programming; and
a video gate signal for each said frame of said audio-video programming, said video gate signal having cell coordinates defining the region within each said frame to be obscured.

7. The automatic multivariate censorship system described in claim 6 wherein said cell coordinates comprise:
at least eight vertical and eight horizontal values whereby each said frame embraces least 64 cells.

8. The automatic multivariate censorship system described in claim 5 wherein said censorship classification data comprise:
at least four progressive censorship levels for each of at least four different censorship subjects.

9. An automatic censor apparatus for selectable censorship of a cinema projection performance having censorship classification encoding and comprising a series of frames each of said frames having a plurality of cells, said apparatus comprising:
selector means for selecting a multivariate mode of censorship having a plurality of mode thresholds;
decoder means for recovering said censorship classification data from said encoded cinema performance;
censor decision means for generating audio and video obscuration commands in response to said censorship classification data that meet or exceed said selected censorship mode thresholds;
video obscuring means for obscuring a predetermined number of cells less than said plurality of cells in each frame of said cinema performance in response to said obscuration commands; and
audio obscuring means for obscuring a portion of said cinema performance in response to said audio obscuration commands.

10. The automatic censor apparatus described in claim 9 wherein said audio and video obscuration commands comprise:
an audio gate signal for each said frame interval of said cinema projection performance; and
a video gate signal for each said frame of said cinema projection performance, said video gate signal having cell coordinates defining the region within each said frame to be obscured.

11. The automatic censor apparatus described in claim 10 wherein said cell coordinates comprise:
at least eight vertical and eight horizontal values whereby each said frame embraces at least 64 cells.

12. The automatic censor apparatus described in claim 10 wherein said video obscuring comprises:
light valve means for partially blocking each said cinema performance frame projection in response to said video gate signal.

13. The automatic censor apparatus described in claim 9 wherein said multivariate censorship mode comprises:
at least four censorship thresholds for each of at least four different censorship subjects.

14. An automatic multivariate censorship system for a cinema project performance comprising a series of frames each of said frames having a plurality of cells, said system comprising:
encoder means for adding censorship classification data to each said cinema projection performance frame interval, said censorship classification data having a plurality of independent censorship classification variables;
cinema projection means for projecting said encoded cinema performance onto a viewing surface;
selector means for selecting a multivariate mode of censorship having a plurality of mode thresholds;
decoder means for recovering said censorship classification data from said encoded cinema performance;
censor decision means for generating audio and video obscuration commands in response to said censorship classification data that meet or exceed said selected censorship mode thresholds;
video obscuring means for obscuring a predetermined number of cells less than said plurality of cells in each frame of said cinema performance in response to said video obscuration commands; and
audio obscuring means for partially obscuring said cinema performance in response to said audio obscuration commands.

15. The automatic multivariate censorship system described in claim 14, wherein said audio and video obscuration commands comprise:
an audio gate signal for each said frame interval of said cinema projection performance; and
a video gate signal for each said frame of said cinema projection performance, said video gate signal having cell coordinates defining the region within each said frame to be obscured.

16. The automatic multivariate censorship system described in claim 15 wherein said cell coordinates comprise:
at least eight vertical and eight horizontal values whereby each said frames embraces at least 64 cells.

17. The automatic multivariate censorship system described in claim 15 wherein said video obscuring means comprises:
light valve means for partially blocking said cinema performance frame projection in response to said video gate signal.

18. The automatic multivariate censorship system described in claim 14 wherein said censorship classification data comprise:
at least four censorship levels for each of at least four different censorship subjects.

19. A method for automatic multivariate censorship of audio-video programming having a series of audio-video frames, each said frame having a plurality of cells, said audio-video programming in each said cell being associated with one or more multivariate censorship classification data, said method comprising the following steps:
evaluating said audio-video programming to determine said multivariate censorship classification data for every said cell within each said video frame and for each audio frame interval of said audio-video programming;
encoding said audio-video programming by adding said censorship classification data to the end of each said audio-video frame;
transmitting said encoded audio-video programming to at least one receiving user;

receiving said transmitted audio-video programming;

decoding said received audio-video programming by recovering said censorship classification data from each said audio-video frame;

comparing said censorship classification data to user-selected censorship mode thresholds; and obscuring the reproduction of said audio-video programming in a predetermined number of cells less than said plurality of said audio-video frame cells for each frame for which said censorship classification meets or exceeds said user-selected censorship mode.

20. The method described in claim 19 wherein said censorship classification data comprises:

at least four censorship levels for each of at least four different censorship subjects.

21. The method described in claim 19 wherein said encoding step comprises the steps of:

converting said censorship classification data to digital form; and adding said digital censorship data to the vertical retrace portion of each said audio-video frame.

22. An automatic decensoring apparatus for selectable decensorship of audio-video programming having censorship classification encoding and comprising a series of frames each of said frames having a plurality of cells wherein the audio-video programming is obscured in accordance with said encoding, said apparatus comprising:

selector means for selecting a multivariate mode of censorship having a plurality of mode thresholds;

decoder means for recovering said censorship classification data from said encoded audio-video programming;

censor decision means for generating audio and video deobscuration commands in response to said censorship classification data that fail to meet or exceed said selected censorship mode thresholds;

video deobscuring means for reversing the obscuration for a predetermined number of cells less than said plurality of cells in each frame of said video programming in response to said video deobscuration commands; and audio deobscuring means for reversing the partial obscuration of said audio programming in response to said audio deobscuration commands.

23. The automatic multivariate censorship system described in claim 5 for audio-video programming having portions of each said frame obscured in accordance with said censorship classification data, further comprising:

video deobscuring means for reversing the partial obscuration of said video programming in response to said video obscuration commands; and audio deobscuring means for reversing the partial obscuration of said audio programming in response to said audio obscuration demands.

24. A method for automatic multivariate censorship of audio-video programming having a series of audio-video frames, each said frame having a plurality of cells, said audio-video programming in each said cell being associated with one or more multivariate censorship classification data, said method comprising the following steps:

evaluating said audio-video programming to determine said multivariate censorship classification data for every said cell within each said video frame and for each audio frame interval of said audio-video programming;

encoding said audio-video programming by adding said censorship classification data to the end of each said audio-video frame;

obscuring said audio-video programming in a predetermined number of cells less than said plurality of said audio-video frame cells for each frame for which said censorship classification data specifies any censorship;

transmitting said encoded and obscured audio-video programming to at least one receiving user;

receiving said transmitted audio-video programming;

decoding said received audio-video programming by recovering said censorship classification data for each said audio-video frame;

comparing said censorship classification data to user-selected censorship thresholds; and deobscuring the obscured portions of the reproduction of said audio-video programming in a predetermined number of cells less than said plurality of said audio-video frame cells for each frame for which said censorship classification fails to meet or exceed said user-selected censorship mode.

* * * * *

UNITED STATES PATENT AND TRADEMARK OFFICE
CERTIFICATE OF CORRECTION

PATENT NO.  :   5,195,135
DATED       :   March 16, 1993
INVENTOR(S) :   Douglas A. Palmer It is certified that error appears in the above-identified patent and that said Letters Patent is hereby corrected as shown below:

Col 7, Line 3, Replace "VFC 0" with --VFC 10--; and
       Line 5, Replace "FIGS. and 2" with --FIGS. 1 and 2--.

Col 8, Line 65, Insert --obscuring-- after "for".

Col 9, Line 17, Insert --at-- after "embraces".

Signed and Sealed this

Sixteenth Day of November, 1993

Attest:

BRUCE LEHMAN

Attesting Officer

Commissioner of Patents and Trademarks